United States Patent
Schultz

(10) Patent No.: US 6,192,371 B1
(45) Date of Patent: Feb. 20, 2001

(54) OBJECT MORPHING IN AN OBJECT ORIENTED COMPUTING ENVIRONMENT USING RELATIONAL DATABASE QUERY PROCEDURE

(75) Inventor: Thomas Alan Schultz, Naperville, IL (US)

(73) Assignee: Lucent Technologies, Inc, Murray, NJ (US)

( * ) Notice: Under 35 U.S.C. 154(b), the term of this patent shall be extended for 0 days.

(21) Appl. No.: 09/301,147

(22) Filed: Apr. 28, 1999

(51) Int. Cl.[7] .................................................. G06F 17/30
(52) U.S. Cl. ................... 707/103; 707/2; 707/4; 707/100; 707/104; 709/315; 711/170; 711/207; 717/10; 717/5
(58) Field of Search .................. 707/103, 2, 4, 707/104, 100; 709/315; 711/170, 207; 717/10, 5

(56) References Cited

U.S. PATENT DOCUMENTS

| | | | |
|---|---|---|---|
| 5,295,256 | * | 3/1994 | Bapat ................................... 395/705 |
| 5,660,005 | * | 8/1997 | Tacoma ................................ 52/93.2 |
| 5,724,575 | * | 3/1998 | Hoover et al. ...................... 707/10 |
| 5,752,249 | * | 5/1998 | Macon, Jr. et al. ............... 707/103 |
| 5,761,493 | * | 6/1998 | Blakeley et al. .................... 707/4 |
| 5,819,257 | * | 10/1998 | Monge et al. ....................... 707/2 |
| 5,832,498 | * | 11/1998 | Exertier ............................... 707/103 |
| 5,872,973 | * | 2/1999 | Mitchell et al. .................... 709/305 |
| 5,903,725 | * | 5/1999 | Colyer ................................. 707/103 |
| 5,933,144 | * | 8/1999 | Alcorn ................................. 345/347 |
| 6,023,704 | * | 2/2000 | Gerard et al. ....................... 707/103 |
| 6,044,380 | * | 3/2000 | Gerard et al. ....................... 707/103 |

* cited by examiner

Primary Examiner—Hosain T. Alam
Assistant Examiner—Jean M. Corrielus

(57) ABSTRACT

A method, system and computer program product are disclosed for morphing an object from one class to another in an object oriented computing environment implemented by a relational database. Object morphing functionality is provided by first defining object classes, class attributes, class relationships, objects, object attributes and object relationships as tables of data in the relational database. In response to user input representing a request to reassign one of the objects from one class to another, a class identifier corresponding to the object in the database tables is changed. The object's edge relationships with other objects are then checked for continued validity and an error message is generated if any such edge relationships are no longer valid. If the object's edge relationships are valid, the attributes of the object are modified to reflect the new class assignment. This includes maintaining existing attributes that are carried over from the old class to the new class (or superclasses thereof), adding new object attributes defined in the new class but not in the old class (or superclasses thereof), and deleting old object attributes defined in the old class but not in the new class (or superclasses thereof).

20 Claims, 5 Drawing Sheets

FIG. 4 class 50

| class | abstract |
|---|---|
| ClassA | This is a class called ClassA |
| SuperClassA | This is a class called SuperClassA |
| SuperClassB | This is a class called SuperClassB |
| SuperSuperClassA | This is a class called SuperSuperClassA |
| ClassC | This is a class called ClassC |
| SuperClassC | This is a class called SuperClassC |

FIG. 5 class_attribute 60

| class | attribute | properties |
|---|---|---|
| ClassA | Attr2 | NOCREATE |
| ClassA | Attr3 | NONE |
| ClassA | Attr4 | NONE |
| ClassA | Attr5 | NONE |
| SuperClassA | Attr1 | NONE |
| SuperClassB | Attr13 | REQUIRED |
| SuperClassB | Attr3 | NOCREATE |
| SuperClassB | Attr2 | NONE |
| SuperSuperClassA | Attr1 | NOCREATE |
| ClassC | Attr6 | REQUIRED |
| ClassC | Attr7 | REQUIRED |
| ClassC | Attr8 | REQUIRED |
| ClassC | Attr9 | REQUIRED |
| ClassC | Attr10 | NOCREATE |
| SuperClassC | Attr11 | NOCREATE |
| SuperClassC | Attr12 | NONE |
| SuperClassC | Attr4 | REQUIRED |
| SuperClassC | Attr5 | REQUIRED |
| SuperClassC | Attr9 | NONE |
| SuperClassC | Attr2 | NONE |
| SuperClassC | Attr10 | NONE |
| SuperClassC | Attr1 | NONE |

FIG. 6 class_edge ~70

| parent_class | child_class | edge |
|---|---|---|
| SuperClassB | ClassA | IS-A |
| SuperSuperClassA | SuperClassA | IS-A |
| SuperClassA | ClassA | IS-A |
| SuperClassC | ClassC | IS-A |

FIG. 7 class_path ~80

| parent_class | child_class | edge | path_length | path_count |
|---|---|---|---|---|
| ClassA | ClassA | REFLEXIVE | 0 | 1 |
| SuperClassA | SuperClassA | REFLEXIVE | 0 | 1 |
| SuperClassB | SuperClassB | REFLEXIVE | 0 | 1 |
| SuperSuperClassA | SuperSuperClassA | REFLEXIVE | 0 | 1 |
| SuperClassA | ClassA | IS-A | 1 | 1 |
| SuperClassB | ClassA | IS-A | 1 | 1 |
| SuperSuperClassA | SuperClassA | IS-A | 1 | 1 |
| SuperSuperClassA | ClassA | IS-A | 2 | 1 |
| SuperClassC | ClassC | IS-A | 1 | 1 |

FIG. 8 object ~90

| object_id | name | class |
|---|---|---|
| 1 | Obj 1 | ClassA |
| | | |

FIG. 9 object_attribute ~100

| object_id | attribute | properties | attribute_value |
|---|---|---|---|
| 1 | Attr13 | REQUIRED | |
| 1 | Attr3 | NONE | |
| 1 | Attr1 | NONE | |
| 1 | Attr4 | NONE | |
| 1 | Attr5 | NONE | |

FIG. 10 object_edge — 110

| parent_object_id | child_object_id | edge |
|---|---|---|
|  |  |  |

FIG. 11 object_path — 120

| parent_object_id | child_object_id | edge | path_count |
|---|---|---|---|
| 1 | 1 | REFLEXIVE | 1 |

FIG. 12 object_attribute — 100

| object_id | attribute | properties | attribute_value |
|---|---|---|---|
| 1 | Attr13 | REQUIRED |  |
| 1 | Attr3 | NONE |  |
| 1 | Attr4 | NONE | 100 |

FIG. 13 object_attribute — 100

| object_id | attribute | properties | attribute_value |
|---|---|---|---|
| 1 | Attr4 | REQUIRED | 100 |
| 1 | Attr12 | NONE |  |
| 1 | Attr2 | NONE |  |
| 1 | Attr9 | REQUIRED |  |
| 1 | Attr5 | NONE |  |
| 1 | Attr6 | REQUIRED |  |
| 1 | Attr7 | REQUIRED |  |
| 1 | Attr8 | REQUIRED |  |

OBJECT MORPHING IN AN OBJECT ORIENTED COMPUTING ENVIRONMENT USING RELATIONAL DATABASE QUERY PROCEDURE

CROSS-REFERENCE TO RELATED APPLICATIONS

This application relates to application Ser. No. 08/790,302, filed Jan. 31, 1997, now U.S. Pat. No. 5,819,257, entitled "PROCESS FOR PROVIDING TRANSITIVE CLOSURE USING FOURTH GENERATION STRUCTURED QUERY LANGUAGE (SQL)," and application Ser. No. 09/024,913, filed Feb. 17, 1998, now U.S. Pat. No. 6,105,035, entitled "OBJECT ORIENTED PROGRAMMING USING STANDARD QUERY LANGUAGE (SQL)," in which the present inventor is a named co-inventor. The disclosures of these applications are incorporated herein by this reference.

STATEMENT REGARDING FEDERALLY SPONSORED RESEARCH OR DEVELOPMENT

Not Applicable

BACKGROUND OF THE INVENTION

1. Field of the Invention

This invention relates to object oriented programming. More particularly, the invention concerns the implementation of an object-oriented computing environment using a relational database. Still more particularly, the invention pertains to a method, system and computer program product for changing ("morphing") a class variable ("object" or "instance") defined in an object oriented computing environment from one abstract data type ("class") to another using relational database programming operations.

2. Description of the Prior Art

The above-referenced related patent applications disclose systems and methods for implementing an object oriented computing environment using a relational database storage system and a front-end programming interface implementing a relational programming language, such as SQL. In the application Ser. No. 08/790,302, filed Jan. 31, 1997, now U.S. Pat. No. 5,819,257, entitled "PROCESS FOR PROVIDING TRANSITIVE CLOSURE USING FOURTH GENERATION STRUCTURED QUERY LANGUAGE (SQL)," it is shown that an object oriented computing environment can be modeled as a directed acyclic graph, with the nodes of the graph representing classes or objects and the edges and paths between nodes representing hierarchical relationships between the classes or objects. These graph elements (nodes, edges and paths) are stored as relations (tables) in a relational database and relational database query techniques are used to determine the transitive closures between graph nodes, thus providing an object oriented class hierarchy representation in the database. The class hierarchy representation is fully updatable insofar as appropriate table modification procedures are invoked (e.g., using stored procedures) as classes or objects are added to, or removed from, the object oriented computing environment.

In the application Ser. No. 09/024,913, filed Feb. 17, 1998, now U.S. Pat. No. 6,105,035, entitled "OBJECT ORIENTED PROGRAMMING USING STANDARD STRUCTURED QUERY LANGUAGE (SQL)," it is shown that an object oriented computing environment can be completely modeled in a relational database. Tables are used to represent the salient elements of the object oriented computing environment, and include (1) a class identifier table identifying one or more classes, (2) a class edge table defining the edges between classes, (3) a class path table defining the paths between classes, a class attribute table identifying the attributes of each class and their data type, (4) a class method table identifying the methods associated with each class, (5) an object table identifying each instantiated object, its class and its owner, (6) an object edge table defining the edges between objects, (7) an object path table defining the paths between objects, and (8) an object attribute table identifying the attributes of each object and their values. Rules (e.g., triggers) are created that "fire" in response to selected relational database query operations (table updates and deletes, attribute value assignments, etc.). These rules help provide and maintain class and object functionality, and implement support for such object oriented properties as inheritance, data encapsulation and polymorphism.

What is not supported in the foregoing system is the ability to automatically effect a change in object type after an object is initially defined. This is often desirable in an object-oriented computing environment because it allows the computing environment to adapt to changed circumstances. Consider the aforementioned patent application Ser. No. 09/024,913, filed Feb. 17, 1998, now U.S. Pat. No. 6,105,035, entitled "OBJECT ORIENTED PROGRAMMING USING STANDARD STRUCTURED QUERY LANGUAGE (SQL)," in which the example of an object oriented product development tracking tool is used. In this exemplary software program, large development projects are segmented into project features which are represented as objects. Each project feature object represents an instantiation of a defined feature class that exists within a feature class hierarchy. FIG. 1 of the aforesaid patent application illustrates the use of a feature super-super-class, a pair of large_feature and small_feature super-classes that are the descendants of the feature super-super-class, and a pair of xlarge_feature and xsmall_feature classes that are the descendants of the large_feature and small_feature super-classes, respectively.

If it is desired, by way of example, to reassign a project feature object from the small_feature super-class to the large_feature super-class, the relational database tables that define the project feature object would need to be manually updated by the user. The user would have to remove object attributes that are defined relative to the old class definition but not the new class definition, retain the attributes that are common to both class definitions, and add the new attributes that are part of the new class definition. This process may be referred to as "morphing" because it can be likened to the process of morphing a picture of a face of one person to a face of another person.

Support for object morphing in prior art object oriented computing systems is usually non-existent or supported very poorly. Typical implementations require a morphed object to acquire a new object identifier, thereby requiring the update of all objects that reference the old object identifier. An implementation that does not require such overhead would provide a significant improvement relative to prior art systems. A system and method that utilizes relational database technology and which does not require manual table updating operations would be further desirable.

Accordingly, there is a need in an object oriented computing environment, and particularly an object oriented environment implemented in a relational database, for a system and method that allows object class reassignment, i.e., morphing, to be implemented automatically in response to user commands, and without requiring re-identification of the object along with a concomitant modification of referencing objects. What is required is a system and method for object morphing in an object oriented computing environment that implements the foregoing advantages.

SUMMARY OF THE INVENTION

A solution to the foregoing problem is provided by a method, system and computer program product for morphing an object from one class to another in an object oriented computing environment implemented by a relational database. Object morphing functionality is provided by first defining object classes, class attributes, class relationships, objects, object attributes and object relationships as tables of data in the relational database. In response to user input representing a request to reassign one of the objects from one class to another, a class identifier corresponding to the object in the database tables is changed. Edge relationships between the morphed object and other objects in the system are then checked for continued validity and an error message is generated if any such edge relationships are no longer valid. If the edge relationships are valid, the attributes of the object are modified to reflect the new class assignment by adding new object attributes or deleting existing object attributes in accordance with the object attributes of the old and new classes and any superclasses thereof.

In preferred embodiments of the invention, the changing of an object's class is preferably implemented by changing a class identifier field corresponding to the object in an object table maintained by the database. Checking for continued validity of the object's edge relationships relative to other objects following morphing is preferably implemented by comparing parent/child object edge relationship fields in an object_edge table maintained by the database against parent/child class edge relationship fields in class_edge and class_path tables maintained by the database. Modification of an object's attributes following morphing is preferably implemented by updating object attribute property value fields corresponding to the morphed object in an object_attribute table maintained by the database. These updates are based on the attribute property value fields in a class_attribute table maintained by the database, which correspond to the old and new classes and any related superclasses thereof. Updating may be implemented to accommodate single or multiple inheritance with inheritance override, or single or multiple inheritance without inheritance override.

Updating an object's attributes preferably additionally includes maintaining object attribute fields for the object in the object_attribute table if corresponding attributes fields exist in the class_attribute table for both the old and new classes. Updating an object's attributes preferably further includes deleting object attribute fields in the object_attribute table that correspond to the object but which are not authorized for creation in attribute fields of the class_attribute table that correspond to the new class or any superclasses thereof. Updating an object's attributes preferably further includes deleting the object's attribute fields in the object_attribute table if corresponding attribute fields do not exist in the class-attribute table for the new class or any superclasses thereof. Updating an object's attributes preferably further includes inserting object attribute fields corresponding to the object in the object_attribute table for attributes defined in attribute fields of the class_attribute table that correspond to the new class and any superclasses thereof.

Preferably, the above-described object morphing functions are implemented as a stored procedure that executes in response to a user inputting an object morphing command. An SQL rule can be set to invoke the stored procedure following such input.

BRIEF DESCRIPTION OF THE DRAWING

The foregoing and other features and advantages of the invention will be apparent from the following more particular description of a preferred embodiment of the invention, as illustrated in the accompanying Drawing, in which:

FIG. 4 is a block diagram illustrating a relational database "class" table created in accordance with the invention;

FIG. 5 is a block diagram illustrating a relational database "class_attribute" table created in accordance with the invention;

FIG. 6 is a block diagram illustrating a relational database "class_edge" table created in accordance with the invention;

FIG. 7 is a block diagram illustrating a relational database "class_path" table created in accordance with the invention;

FIG. 8 is a block diagram illustrating a relational database "object" table created in accordance with the invention;

FIG. 9 is a block diagram illustrating a relational database "object_attribute" table created in accordance with the invention;

FIG. 10 is a block diagram illustrating a relational database "object_edge" table created in accordance with the invention;

FIG. 11 is a block diagram illustrating, a relational database "object_path" table created in accordance with the invention;

FIG. 12 is a block diagram illustrating a user-modified "object_attribute" table; and FIG. 13 is a block diagram illustrating a system-modified "object_attribute" table following an object morphing operation in accordance with the invention.

DETAILED DESCRIPTION OF THE PREFERRED EMBODIMENT

Figure 1:
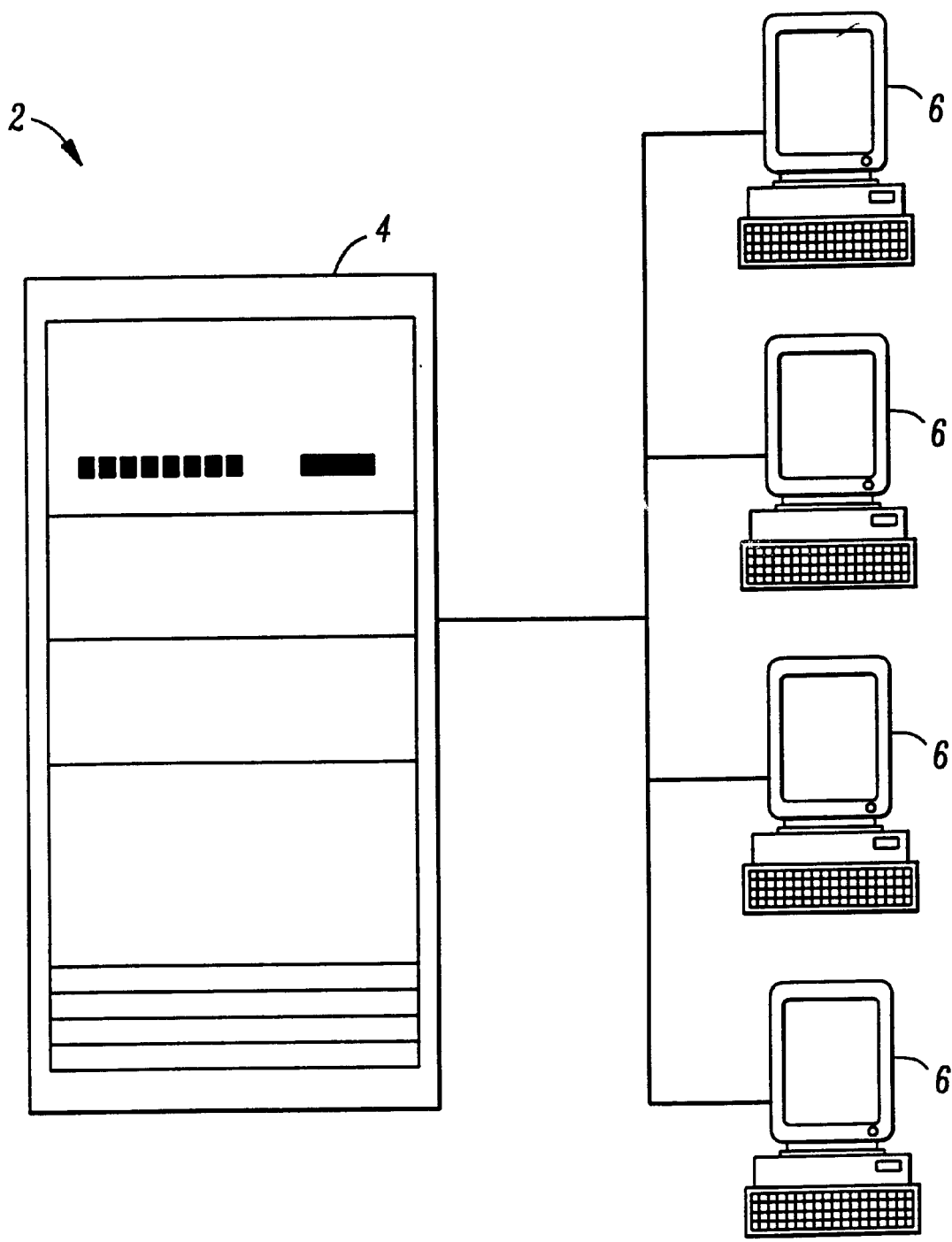
FIG. 1 is a diagrammatic view of a computer system providing an object oriented computing environment using a relational database in accordance with the invention.

Turning now to the figures, wherein like reference numerals represent like elements in all of the several views, FIG. 1 illustrates an exemplary computer system 2 that provides an object oriented computing environment using a relational database in accordance with the invention. The computer system 2 includes a database server 4 that receives command input from, and provides data output to, one or more work stations 6. As is known in the art, a relational database could be implemented entirely on the server 4 or could be distributed across a network of similar servers as a partitioned relational database. Additionally, the server 4 could be combined with a work station 6 to provide a single user, non-networked database system.

Figure 2:
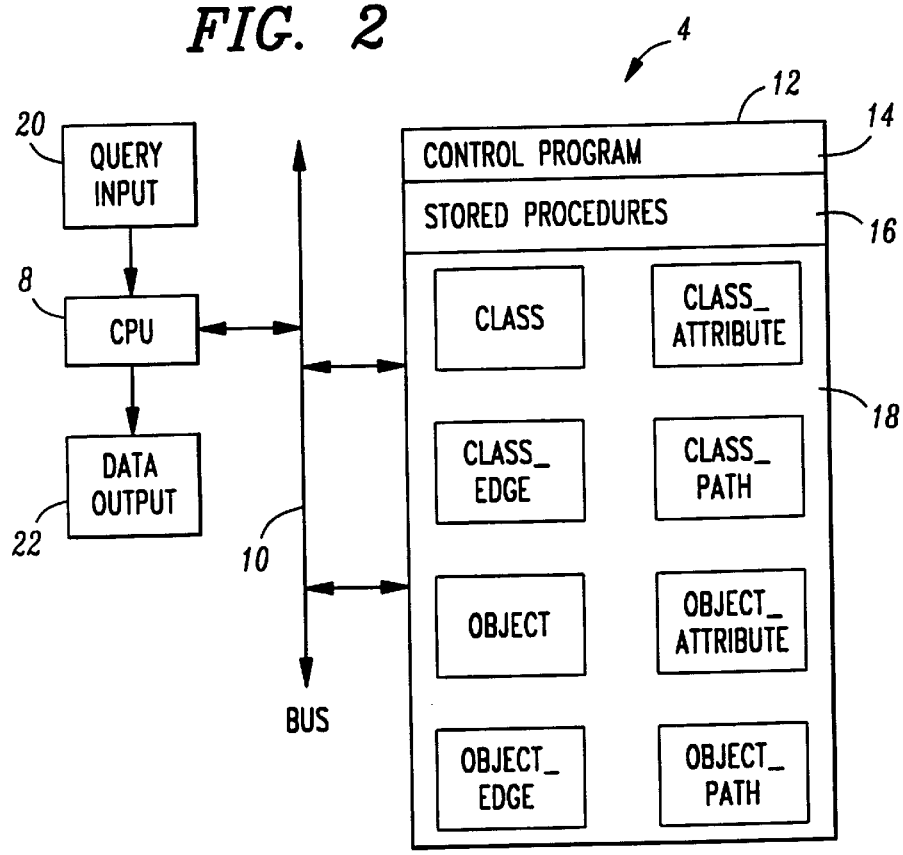
FIG. 2 is a block diagram showing hardware and software components of the computer system of FIG. 1.

Turning now to FIG. 2, the server 4 includes a central processing unit (cpu) 8 communicating over a shared bus 10 with a data storage medium 12, such as a disk drive or disk drive array. The data storage medium 12 stores a relational data base control program 14, one or more stored procedure programs 16, and a plurality of tables collectively identified by reference numeral 18. As is conventional, program memory (not shown) is provided for use during program execution. Query input in the form of requests for data, data updates, data deletes, and other commands, is provided to the server 4 at 20. Data output is provided to database users at 22.

As is well known in the database art, the control program 12 may include the usual lexing, parsing, semantic checking, and query optimization components found in modern relational database systems. Among other things, the control program allows appropriate constraints and triggers to be added to user queries received at the query input 20, to maintain database integrity. The stored procedures 16 would typically be written by database administrators to implement automated database functions in response to user queries. One such stored procedure, described in more detail below, is used to provide the object morphing functionality of the present invention. The tables 18 represent tables that allow the relational database to implement an object oriented computing environment with object morphing capability. The structure and function of each table are described below.

Figure 3:
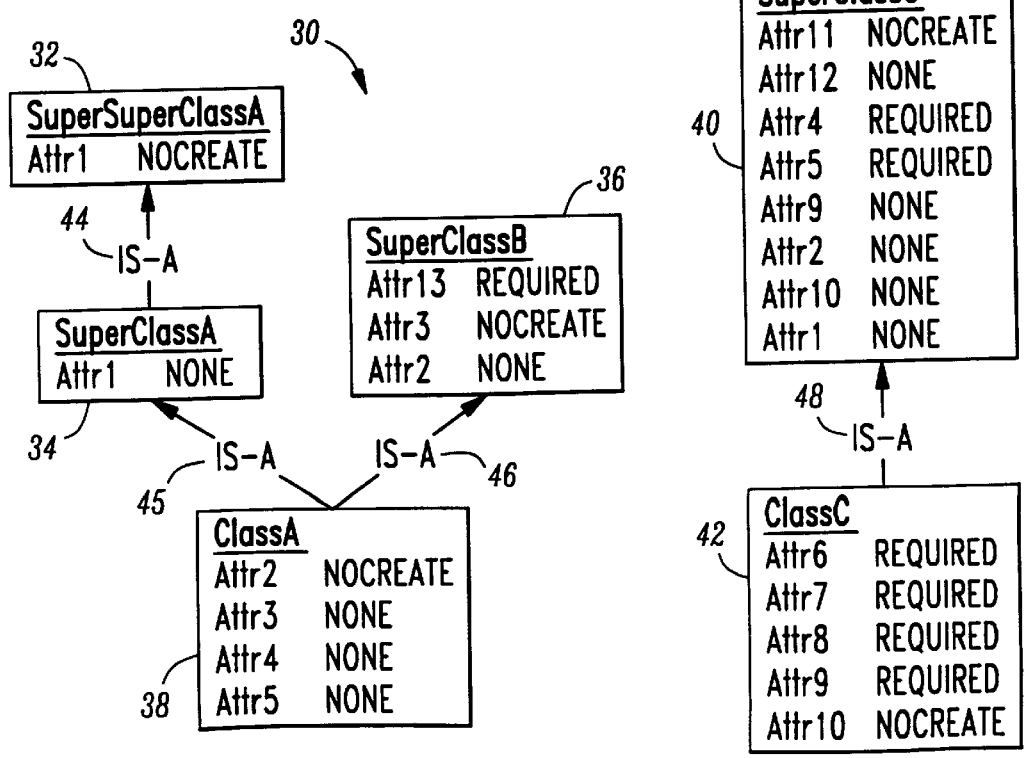
FIG. 3 is a block diagram illustrating a hierarchy of object oriented classes which may be defined using the computer system of FIG. 1.

Turning now to FIG. 3, an object-oriented class hierarchy 30 is shown as including a defined class 32 identified as "SuperSuperClass A," a defined class 34 identified as "SuperClassA," a defined class 36 identified as "SuperClassB," a defined class 38 identified as "ClassA," a defined class 40 identified as "SuperClassC," and a defined class 42 identified as "ClassC." The classes 32, 34, 36 and 38, and the classes 40 and 42, are shown as being related by "IS-A" edges 44, 45, 46 and 48. As is well known in the object oriented programming art, an IS-A edge defines an inheritance relationship in which one class "is a" member of another class. The arrows in FIG. 3 illustrate the hierarchy. Thus, SuperClassA "is a" member of SuperSuperClassA (single inheritance). Class A "is a" member of SuperClassA and SuperClassB (multiple inheritance). ClassC is a member of SuperClassC (single inheritance). Another important object oriented edge relationship that could exist in FIG. 3 is the "HAS-A" relationship. This is essentially a containing relationship used to segment a class or object into constituent parts that are referenced by the class or object. For example, an automobile "has a" steering wheel.

Each class definition shown in FIG. 3 includes a set of attributes. Each attribute has a property value of NONE, NOCREATE, or REQUIRED. A value of NONE means that no property has been set. A property value of NOCREATE means that an attribute instance of that attribute is never to be created. A property value of REQUIRED means that the attribute instance can never be deleted.

According to the above-referenced patent application Ser. No. 08/790,302, filed Jan. 31, 1997, now U.S. Pat. No. 5,819,257, entitled "PROCESS FOR PROVIDING TRANSITIVE CLOSURE USING FOURTH GENERATION STRUCTURED QUERY LANGUAGE (SQL)" and patent application Ser. No. 09/024,913, filed Feb. 17, 1998, now U.S. Pat. No. 6,105,035, entitled "OBJECT ORIENTED PROGRAMMING USING STANDARD QUERY LANGUAGE (SQL)," the object class representations of FIG. 3 can be represented by the relational database tables shown in FIGS. 4–7. The table 50 of FIG. 4, which is labelled "class," contains a listing of each class of FIG. 3 and an associated descriptive abstract. The table of 60 of FIG. 5, which is labelled "class_attribute," contains a listing of the attributes defined for each class in FIG. 3 and the associated property values of "NONE," "NOCREATE" and "REQUIRED." The table 70 of FIG. 6, which is labelled "class_edge," contains a listing of all edges extending between classes, along with an edge type. The table 80 of FIG. 7, which is labelled "class_path," contains a listing of all of the paths extending between classes, along with a path type, the number of edges per path and the number of paths between any two classes. Paths between a class and itself are labelled as "REFLEXIVE" and are used to simplify the SQL morphing procedure used to implement the invention.

Assume it is desired to create an object instance ("object") of ClassA named Obj1. According to the patent application Ser. No. 08/790,302, filed Jan. 31, 1997, now U.S. Pat. No. 5,819,257, entitled "PROCESS FOR PROVIDING TRANSITIVE CLOSURE USING FOURTH GENERATION STRUCTURED QUERY LANGUAGE (SQL)" and patent application Ser. No. 09/024,913, filed Feb. 17, 1998, now U.S. Pat. No. 6,105,035, "OBJECT ORIENTED PROGRAMMING USING STANDARD QUERY LANGUAGE (SQL)," the Obj1 object can be represented by the relational database tables shown in FIGS. 8–11. The table 90 of FIG. 8, which is labelled "object," contains a listing of object identifiers along with associated object names and object class identifiers. The table row corresponding to Obj1 shows that Obj1 has been assigned an object_id of "1" and is identified as being a member of "ClassA." The table of 100 of FIG. 9, which is labelled "object_attribute," contains a listing of attributes assigned to each object listed in the object table 90 of FIG. 8, along with their associated attribute property values of "NONE," "NOCREATE" or "REQUIRED," and a listing attribute values, if such have been assigned.

Table 100 shows that Obj1 has five attributes labelled Attr 13, Attr 3, Attr1, Attr 4 and Attr 5. The first attribute Attr13, which has an assigned property value of REQUIRED, would be assigned when Obj1 is created because Obj1 is a member of ClassA, and ClassA inherits the Attr13 property from SuperClassB, as shown in FIG. 3. The attribute Attr3 derives from ClassA. The attribute Attr1 derives from SuperSuperClassA, where it is assigned a property value of "NOCREATE," and SuperClassA, where it is assigned a property value of "NONE." The fact that the Attr1 attribute has a property value of "NONE" in the object_attribute table 100 illustrates the concept of inheritance with override. The attributes Attr 4 and Attr 5 derive from ClassA and have property values of "NONE." Note that ClassA and SuperClassB (see FIG. 3) both have attributes labelled "Attr2." This attribute has a property value of "NONE" in SuperClassB and a property value of "NOCREATE" in ClassA. By implementing inheritance override, the "NOCREATE" property value of ClassA is controlling and the Attr2 attribute is not assigned to Obj1 in the object_attribute table 100.

The table 110 of FIG. 10, which is labelled "object_edge," contains a listing of edges extending between objects. Insofar as the present example involves only a single object Obj1, the object_edge table 110 is empty. The table 120 of FIG. 11, which is labelled "object_path," contains a listing of all paths extending between objects. Insofar as the present example involves only a single object Obj1, the object_edge table 110 contains only one self-referencing path which is labelled as "REFLEXIVE."

Assume that during the course of database operations, a database user issues a query command to modify Obj1 by deleting attributes Attr1 and Attr5, and assigning a value of 100 to attribute Attr4. This results in a modification of the object_attribute table 100, as shown in FIG. 12. Now assume that the database user issues a query command to morph Obj1 from ClassA to ClassC (see FIG. 3). This operation results in modifications to several tables, including the "class" field in the object table 90 of FIG. 8, and the various attribute fields of the object_attribute table 100 of FIG. 9. Importantly, the class identifier and class name fields of the object table 40 remain unchanged, thus maintaining continuity with other objects that relate to Obj1. As described in more detail below, a check is also made of the object_edge table 110 of FIG. 10, and the class_edge table 70 of FIG. 6, to determine whether the morphing operation has resulted in any invalid object_edge definitions.

The modification of the object_attribute table 100 resulting from the morphing of Obj1 from ClassA to ClassC is shown in FIG. 13. As can be seen by comparison with FIG. 12, Attr13 and Attr3 were removed because they are not defined in ClassC or its superclass SuperClassC. Attr4 and its value 100 were retained but the property value was changed from "NONE" to "REQUIRED" because the "REQUIRED" property value was assigned to Attr 4 in SuperClassC. Attr12 and Attr2 were added because they are defined in SuperClassC. Attr9 is defined in ClassC and SuperClassC with property values of "REQUIRED" and "NONE," respectively. The latter value is assigned to Attr9 for Obj1 because the ClassC definition overrides the inherited definition from SuperClassC. Even though Attr5 was removed in a previous operation (see FIG. 12), it was added back because it is defined as a REQUIRED attribute for SuperClassC. Attr6, Attr7, and Attr8 were added because they are defined in ClassC. Attr1, which was removed in a prior operation, was not added back because it is common to both ClassA and SuperClassC. In other words manual deletion is honored in the case were an attribute is removed prior to morphing and its definition is specified in both the old class and the new class or in any associated superclasses thereof.

The system 2 preferably implements the above-described morphing operation using a stored rule that invokes one of the stored procedures 16, which shall be referred to as a "morph_object" procedure. The stored rule is invoked by the control program 14 whenever a database user issues an SQL "update" command requesting that an object be morphed from one class to another. This form of "update" will be referred to herein as an object morphing command. The rule that invokes the morph_object procedure in response to an object morphing command, may be implemented with the following SQL commands:

```
/*
  The following rule executes the morph_object SQL
    procedure whenever the class field is modified in the
    object table (90).
*/
create rule morph_object after update (class) of object
  where NEW.class!=OLD.class
    execute procedure morph_object (
      object id=NEW.object id,
      old-class=OLD.class,
      new-class=NEW.class
    );
\p\g
```

The morph_object procedure performs several steps to automatically transform an object from one class to another and to modify all relevant database tables. Before performing such steps, however, the procedure initializes itself. The initialization process may be implemented using the following SQL commands:

```
create procedure morph_object (
  object_id integer4 not null not default,
  old class varchar (20) not null not default,
  new-class varchar (20) not null not default
)
AS
DECLARE
  instances integer not null;
  nocreate_mask integer4 not null;
  required_mask integer4 not null;
  msg varchar (255) not null;
BEGIN
/*
  Rather than treat properties as a character string, the
    properties columns of the class_attribute and
    object_attribute tables (60) and (100) are actually
    integer bit fields whose bits are defined as follows:
  NONE 0
  REQUIRED 1
  NOCREATE 2
*/
required_mask=1;
nocreate_mask=2;
```

Following the initialization process, the first step of the object_morph procedure is to create an SQL "view" definition of all possible legal edges that the morphed object could have based on the class edges and class paths defined in the tables 70 and 80 of FIGS. 6 and 7. This view creation step may be implemented with the following SQL commands:

```
/*
  This SQL view definition is used in the SQL procedure
    morph_object. This view derives all legal edges as
    defined in class-edge between to different classes and
    their respective superclasses.
*/
create view legal_edge as
  SELECT
    o1.object_id as parent_object-id,
    o1.class as parent-class,
    o2.object-id as child_object-id,
    o2.class as child-class,
    oe1.edge
  FROM
    object_edge oe1,
    object o1,
    object o2,
    class_path cp1,
    class_path cp2,
    class-edge ce1
  WHERE o1.object_id=oe1.parent_object_id
  AND o2.object_id=oe1.child - object_id
  AND cp1.child_class=o1.class
  AND cp1.edge in ( 'REFLEXIVE' , 'IS-A' )
  AND cp2.child_class=o2.class
  AND cp2.edge in ( 'REFLEXIVE' , 'IS-A' )
  AND ce1.parent_class in ('', cp1.parent_class )
  AND ce1.child_class in ( '', cp2.parent_class )
    AND ce1.edge=oe1.edge
\p\g;
```

The next step in the morph_object procedure is to check whether the morphed object still maintains valid edges to any objects that were previously related to the morphed object as parent objects. If invalid edges are found, an error message is generated. This parent edge validation step may be implemented with the following SQL commands:

```
/*
    Check if parents are still legal after changing an object
        from one class to another. Typical object-oriented
        HAS-A relationships are defined in class_edge table
        (70). This SQL code will check to make sure that
        upon morphing an object, the object_edge table
        (110) containing such HAS-A relationships are still
        valid as defined in class_edge table (70) relative the
        new class.
*/
    SELECT ANY(1) INTO :instances
    FROM object_edge ce JOIN object o
    ON oe.parent_object_id=o.object-id
    LEFT JOIN legal_edge le
    ON o.class=le.parent_class
    AND oe.child_object₁₃ id=le.child_object_id
    WHERE oe.child_object_id=:object_id
    AND le.parent_class IS NULL;
    IF instances>0 THEN
        msg='Error: illegal parent connections exist in morphing '+old-class+' to +new-class;
        RAISE ERROR 100 :msg;
    ENDIF;
```

The next step in the morph_object procedure is to check whether the morphed object still maintains valid edges to any objects that were previously related to the morphed object as child objects. If invalid edges are found, an error message is generated. This child edge validation step may be implemented with the following SQL commands:

```
/*
    Check if children are still legal after changing an object
        from one class to another. Typical object-oriented
        HAS-A relationships are defined in class_edge table
        (70). This SQL code will check to make sure that
        upon morphing an object, the object_edge table
        (110) containing such HAS-A relationships are still
        valid as defined in class_edge table (70) relative the
        new class.
*/
    SELECT ANY(L) INTO :instances
    FROM object_edge ce JOIN object o
    ON oe.child_object_id=o.object_id
    LEFT JOIN legal_edge le
    ON o.class=le.child class
    AND oe.parent_object_id=le.parent_object_id
    WHERE oe.parent_object_id=:object-id
    AND le.child_class IS NULL;
    IF instances>0 THEN
        msg='Error: illegal child connections exist in morphing '+old-class+' to '+new-class;
        RAISE ERROR 100 :msg;
    ENDIF;
```

The next step in the morph_object procedure is to update the existing attribute property values that are specified for the morphed object in the object_attribute table 100, and which are common to both the old class and the new class. The updated property values are those which are defined for the new class and any superclasses thereof in the class_attribute table 60. Support for override of inherited attribute values is preferably provided. This updating step may be implemented with the following SQL commands:

```
/*
    Update the properties values from the attributes that are
        common to both the old class definition and the new
        class definition. Support override of inherited values.
*/
    UPDATE object_attribute
    FROM object o, class_path cp, class-attribute ca
    SET properties=ca.properties,
    WHERE object_attribute.object_id=:object_id
    AND o.object_id=object_attribute.object_id
    AND cp.child_class=o.class
    AND cp.edge in ( 'REFLEXIVE', 'IS-A' )
    AND ca.class=cp.parent_class
    AND ca.attribute=object_attribute.attribute
    AND cp.path_length IN (
        SELECT min (cp1.path length)
        FROM object o1, class_path cp1, class_attribute
            ca1
        WHERE o1.object_id=:object_id
        AND cp1.child_class=o1.class
        AND cp1.edge in ( 'REFLEXIVE', 'IS-A' )
        AND ca1.class=cp1.parent_class
        AND ca1.attribute=object_attribute.attribute
    );
```

The next step in the morph_object procedure is to delete attributes of the morphed object in the object_attribute table 100 that are defined in the new class or in superclasses thereof but which have the "NOCREATE" property value. This deleting step may be implemented with the following SQL commands:

```
/*
    Delete attributes with NOCREATE set. This handles
        the case where after an object is created, the property
        value of an attribute changes to NOCREATE and the
        object is morphed to itself. In such a case, NOCREATE
        attributes must be removed.
*/
    DELETE FROM object_attribute
    WHERE object_id=:object_id
    AND mod( (properties/nocreate_mask), 2)=1;
```

The next step in the morph_object procedure is to delete attributes of the morphed object in the object_attribute table 100 that are not defined in the new class or any superclasses thereof. This deleting step may be implemented with the following SQL commands:

```
/*
    Delete attributes that were defined in the old class
        definition but are not defined in the new class definition
        or any of its superclass parents.
*/
    DELETE FROM object_attribute
    WHERE object_id=:object_id
    AND attribute IN ( SELECT oa1.attribute FROM
        class_path p JOIN class_attribute ca
        ON cp.child_class=:new-class
            AND cp.edge in ( 'REFLEXIVE', 'IS-A' )
        AND ca.class=cp.parent_class
        RIGHT JOIN object_attribute oa1
        ON oa1.attribute=ca.attribute
        WHERE oa1.object_id=:object_id
        AND ca.attribute IS NULL
    );
```

The next step in the morph_object procedure is to insert attributes for the morphed object in the object_attribute table 100 that are defined in the new class or any superclasses thereof, but are not defined in the old class. Support may be provided for single and multiple inheritance, with or without inheritance override, and with or without inheritance exclusion (i.e., NOCREATE). This insertion step may be implemented with the following SQL commands, which include an END command that completes the morph_object procedure:

```
/*
   Insert attributes that are defined in the new class
      definition or one of its superclass parents but were
      not defined in the old class definition. This SQL code
      supports single and multiple inheritance with or
      without inheritance override and with or without
      inheritance exclusion (i.e. NOCREATE).
*/
   INSERT INTO object_attribute
      object id,
      attribute,
      properties
   SELECT
   :object id,
   ca1.attribute,
   ca1.properties
   FROM
   (
      class_path cp1 JOIN class_attribute ca1
      ON cp1.child class=:new_class
      AND cp1.edge in ( 'REFLEXIVE', 'IS-A' )
      AND ca1.class=cp1.parent_class
   )
   LEFT JOIN
   (
      class_path cp2 JOIN class_attribute ca2
      ON cp2.child_class=:old_class
      AND cp2.edge in ( 'REFLEXIVE', 'IS-A' )
      AND ca2.class=cp2.parent_class
   )
   ON ca2.attribute=ca1.attribute
   WHERE cp1.path length IN (
      SELECT min(p.path_length)
      FROM class_path cp, class_attribute ca
      WHERE cp.child_class=:new_class
      AND cp.edge in ( 'REFLEXIVE', 'IS-A' )
      AND ca.class=cp.parent_class
      AND ca.attribute=ca1.attribute
   )
   AND mod ((ca1.properties/nocreate - mask), 2)=0
   AND ( ca2.attribute IS NULL OR (
      cp2.path_length IN (
         SELECT min(cp.path_length)
         FROM class_path cp, class_attribute ca
         WHERE cp.child_class=:old_class
         AND cp.edge in ( 'REFLEXIVE', 'IS-A' )
         AND ca.class=cp.parent class
         AND ca.attribute=ca2.attribute
      ) AND (
         mod ((ca2.properties/nocreate_mask),2)=1 OR
         ( mod ((ca1.properties/required_mask),2)=1
         AND NOT EXISTS (
         SELECT object_id FROM
object_attribute
         WHERE object_id=:object_id
         AND attribute=ca1.attribute
         ))
      )
   ));
   END;
\p\g
```

By implementing the morph_object procedure, a database user need only submit an object morphing command to the database and the computer system 2 will automatically implement all necessary database changes. As stated above, the morph_object procedure software would typically be implemented as a stored procedure 16 maintained on a storage medium controlled by the system 2, such as a permanent disk drive. It will also be appreciated that the stored procedure software (as well as the control program 12) could be recorded on a portable storage medium adapted to inserted into and read by a storage device, such as a drive. Such media include optical (cd-rom or DVD) disks, magnetic floppy disks, and high-capacity removable magnetic storage media. These media would allow the software to sold or leased and installed on customer computer equipment.

Accordingly, a system, method and computer program product for morphing an object from one class to another in an object oriented computing environment have been described. While various embodiments have been disclosed, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for morphing an object from one class to another in an object oriented computing environment, said method comprising the steps of:
   defining object classes, class attributes, class relationships, objects, object attributes and object relationships as tables of data in a relational database;
   receiving user input representing a request to reassign one of said objects from one of said classes to another;
   changing the class identification of said object;
   checking parent/child object relationships of said object for continued validity based on parent/child class relationships of the class to which said object has been morphed and generating an error message if said object relationships are no longer valid; and
   modifying the object attributes of said object to reflect the new class assignment.

2. A method in accordance with claim 1 wherein said changing step includes changing a class identifier field corresponding to said object in said tables.

3. A method in accordance with claim 1 wherein said modifying step includes updating object attribute property value fields corresponding to said object in said tables based on values of said attribute property fields in said tables corresponding to the class to which said object has been reassigned and to any related superclasses thereof.

4. A method in accordance with claim 3 wherein said updating step includes accounting for single and multiple inheritance with inheritance override and/or exclusion.

5. A method in accordance with claim 3 wherein said updating step includes accounting for single and multiple inheritance without inheritance override or exclusion.

6. A method in accordance with claim 3 wherein said updating step includes deleting object attribute fields in said tables that correspond to said object but which do not exist in tables corresponding to the class to which said object has been assigned or to any superclasses thereof.

7. A method in accordance with claim 6 wherein said updating step includes deleting object attribute fields in said tables that correspond to said object but which are not authorized for creation in tables corresponding to the class to which said object has been assigned or to any superclasses thereof.

8. A method in accordance with claim 3 wherein said updating step includes inserting object attribute fields corresponding to said object in said tables that exist in tables corresponding to the class to which said object has been assigned or to any superclasses thereof.

9. A method in accordance with claim 1 wherein said changing, checking and modifying steps are implemented as a stored procedure in response to execution of said changing step.

10. In a database system having a database program for executing query operations on a plurality of database tables, and an user interface for receiving command input, a method for morphing an object from one class to another in an object oriented computing environment implemented in said database system, comprising the steps of:
 a) defining object classes, class attributes, class relationships, objects, object attributes and object relationships as tables of data in said relational database;
 b) receiving a query command for changing one of said objects from one of said object classes to another of said object classes;
 c) changing a class identifier corresponding to said object in said database to reflect the new class, whereby said object becomes a morphed object;
 d) checking said database to determine if the parent and child relationships between said morphed object and other of said objects are still valid after changing said morphed object to said new class, and generating an error message if they are not;
 e) updating one or more object attribute property values corresponding to said morphed object in said database tables based on object attribute property values assigned to said new class and to any associated superclasses of said new class;
 f) deleting object attributes corresponding to said morphed object in said database that have object attribute property values that are defined as NOCREATE;
 g) deleting object attributes corresponding to said morphed object in said database that are not defined relative to said new class or in any associated superclasses of said new class; and
 h) adding object attributes corresponding to said morphed object in said database that are not currently defined relative to said morphed object but which are defined in said database relative to said new class and any associated superclasses of said new class.

11. A method in accordance with claim 10 wherein step (a) includes defining a class table, a class_attribute table, a class_edge table, a class_path table, an object table, an object_attribute table, an object_edge table, and an object_path table.

12. A method in accordance with claim 10 wherein step (b) includes receiving an SQL object morph command identifying the object to be morphed, the old class of which the object to be morphed is a member and the new class to which the object to be morphed is to be assigned.

13. A method in accordance with claim 10 wherein step (c) incudes changing a class identifier field in an object table.

14. A method in accordance with claim 10 wherein step (d) includes checking an object_edge table containing fields corresponding to the object edges defined in the database and a class_edge table containing fields corresponding to the class edges defined in the database, said class_edge table fields containing values that reflect the relationships between said classes.

15. A method in accordance with claim 10 wherein step (e) includes updating object attribute property fields corresponding to said morphed object in an object_attribute table to coincide with corresponding attribute property fields in a class_attribute table that correspond to said new class and any associated superclasses thereof.

16. A method in accordance with claim 10 wherein step (f) includes deleting object attribute fields corresponding to said morphed object in an object_attribute table that have object attribute property fields said table that are defined as NOCREATE.

17. A method in accordance with claim 10 wherein step (g) includes deleting object attribute fields corresponding to said morphed object in an object_attribute table that are not defined in any attribute fields in a class_attribute table relative to said new class or in any associated superclasses thereof.

18. A method in accordance with claim 10 wherein step (h) includes adding object attributes corresponding to said morphed object in an object_attribute table that are not currently defined in said table but which are defined in attribute fields of an object_attribute table corresponding to said new class and to any associated superclasses thereof.

19. A computer-implemented system for morphing an object from one class to another in an object oriented computing environment implemented by a relational database, comprising:
 means for defining object classes, class attributes, class relationships, objects, object attributes and object relationships as tables of data in said relational database;
 means for receiving user input representing a request to reassign one of said objects from one of said classes to another;
 means for changing the class identification of said object in said tables;
 means for checking the object relationships of said object for continued validity by checking parent/child object relationships of said object for continued validity based on parent/child class relationships of the class to which said object has been morphed and generating an error message if said object relationships are no longer valid; and
 means for modifying the object attributes of said object to reflect the new class assignment.

20. A computer program product useable with a relational database computer system for morphing a object from one class to another in an object oriented computing environment implemented by the relational database, comprising:
 a recording medium;
 means, recorded on said recording medium, for defining object classes, class attributes, class relationships, objects, object attributes and object relationships as tables of data in said relational database;
 means, recorded on said recording medium, for receiving user input representing a request to reassign one of said objects from one of said classes to another;
 means, recorded on said recording medium, for changing the class identification of said object in said tables;
 means, recorded on said recording medium, for checking parent/child object relationships of said object for continued validity based on parent/child class relationships of the class to which said object has been morphed and generating an error message if said object relationships are no longer valid; and
 means, recorded on said recording medium, for modifying the object attributes of said object to reflect the new class assignment.

* * * * *